(No Model.)

H. O. CANFIELD.
FACING FOR WRITING MACHINE PLATENS.

No. 579,128. Patented Mar. 23, 1897.

WITNESSES
H. A. Lamb
S. V. Richardson

INVENTOR
Henry O. Canfield
By A. M. Wooster
Atty.

United States Patent Office.

HENRY O. CANFIELD, OF BRIDGEPORT, CONNECTICUT.

FACING FOR WRITING-MACHINE PLATENS.

SPECIFICATION forming part of Letters Patent No. 579,128, dated March 23, 1897.

Application filed November 29, 1895. Serial No. 570,510. (No model.)

*To all whom it may concern:*

Be it known that I, HENRY O. CANFIELD, a citizen of the United States, residing at Bridgeport, in the county of Fairfield and State of Connecticut, have invented certain new and useful Improvements in Facings for Writing-Machine Platens; and I do hereby declare the following to be a full, clear, and exact description of the invention, such as will enable others skilled in the art to which it appertains to make and use the same.

My invention has for its object to produce a facing for platens, more especially platens for writing-machines, which shall possess all of the advantages of either soft, medium, or hard faced platens without the special disadvantages of either class of platens. I thereby secure the sharp clear impressions both in original and carbon copies that result from the use of hard-faced platens, while at the same time the durability of the platen is greatly increased, hardening of the surface in use and cracking or splitting of the facing is wholly prevented, and likewise the danger of injury to the types and loss of alinement from the use of hard-faced platens is wholly avoided. This I accomplish by making my novel facing for platens to consist of inner and outer layers of dissimilar stock, the inner layer being made of a quality of rubber stock that will vulcanize soft and the outer layer being made of a quality of rubber stock that will vulcanize hard. The special formula for preparing either grade of stock is not of the essence of my invention, as it may be varied to an almost unlimited extent without departing from the principle of my invention, it being easily within the knowledge of any expert in the compounding of rubber stocks to prepare a stock that after vulcanizing will be soft and yielding and also to prepare a stock that after vulcanizing will be relatively hard.

Figure 1:
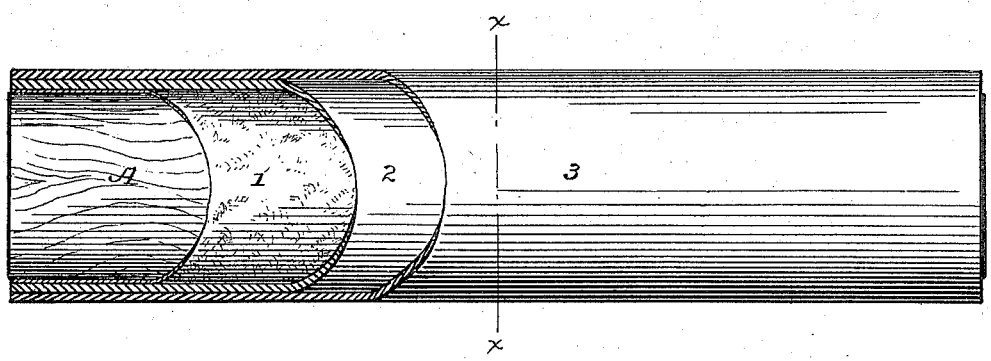
Figure 2:
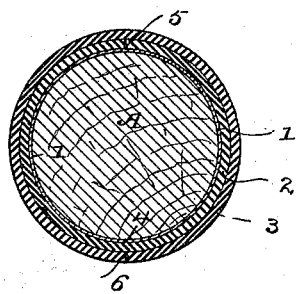

In the accompanying drawings, forming part of this specification, Figure 1 is an elevation of a writing-machine platen, the surface being broken away in layers to show the roll proper, the ply or plies of cloth, and the respective layers of soft-vulcanizing and hard-vulcanizing rubber stock; Fig. 2, a section on the line *x x* in Fig. 1, and Fig. 3 is a similar section in which the facing of the platen is made up of a plurality of alternate layers of soft-vulcanizing and of hard-vulcanizing rubber stock.

In making my novel facing for platens I first wrap one or more plies of cloth, which I have indicated by 1, about a mandrel. Outside of the cloth I wrap one or more plies of what is known as "soft-vulcanizing" stock, the layer of soft-vulcanizing stock being indicated by 2 and the use of one or more plies depending upon the thickness of the stock. Outside of the layer of soft-vulcanizing stock I wrap in the same manner a layer of what is known as "hard-vulcanizing" stock, which I have indicated by 3.

In order that the seams may not show in the completed facings, I preferably place them opposite to each other. For example, the seam in the ply of cloth being placed at 4 the seam in the layer of soft-vulcanizing stock would be placed on the opposite side, as at 5, and the seam in the ply of hard-vulcanizing stock on the opposite side again, as at 6, it being of course immaterial just where the seams are placed, but it is deemed preferable to place them approximately opposite to each other.

Figure 3:
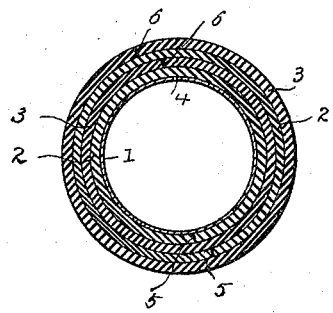

The facing illustrated in Fig. 3 is made in the same manner, except that outside of a first layer of hard-vulcanizing stock I wrap a second layer of soft-vulcanizing stock and outside the second layer of soft-vulcanizing stock I wrap a second layer of hard-vulcanizing stock, preferably, of course, placing the successive seams out of alinement with each other. Having wrapped the ply or plies of cloth and the layers of soft-vulcanizing and of hard-vulcanizing stock about the mandrel, the facing is rolled hard to solidify it and to remove the seams in the usual manner, after which it is placed in an oven and vulcanized. After vulcanizing the facing is removed from the mandrel and finished by smoothing and polishing in the ordinary or in any preferred manner. The facing is then ready to receive the roll, which I have indicated by A and which is driven into it in the usual manner. In use the yielding inner layer, which is made of soft-vulcanizing stock, acts as a cushion or buffer for the hard surface of the outer layer, which is made of hard-vulcanizing stock. The hard layer protects the soft layer and prevents it from becoming hardened by exposure and use, as is the case with ordinary platens. The inner layer of hard-vulcanizing stock when used acts to distribute the force of the blows of the types over a greater surface in the inner layer of soft-vulcanizing stock, thereby producing a harder platen, which will, however, still possess to a perceptible degree the quality of yielding to the blows of the types.

I am aware that it is old to form a roller for type-writing machines consisting of a shell of hard rubber having an outer coating of soft rubber which is vulcanized on the inner shell; but in this case the shell simply forms the roller and is not adapted to be placed on an ordinary platen, and, furthermore, the outer surface is a soft one. I am also aware that it is not new to form a platen-surface having a hard face, as of metal, and a softer backing, as rubber. Such constructions I do not claim.

The facing which I produce is composed of two or more layers of dissimilar vulcanizable rubber stock which are simultaneously subjected to the vulcanizing process to form a practically single cylindrical facing having a yielding inner surface and a relatively hard outer surface, the resulting compound facing being thus adapted to be placed in position on the ordinary roll of a writing-machine.

Having thus described my invention, I claim—

A cylindrical facing for type-writer platens consisting of a plurality of layers of soft-vulcanizing stock and of hard-vulcanizing stock, vulcanized together to form a practically single cylinder having a yielding inner layer and a relatively hard outer surface.

In testimony whereof I affix my signature in presence of two witnesses.

HENRY O. CANFIELD.

Witnesses:
A. M. WOOSTER,
S. V. RICHARDSON.